Patented Jan. 23, 1934

1,944,274

UNITED STATES PATENT OFFICE 1,944,274

PROCESS OF TREATING CHEMICAL COMPOUNDS

Paul L. Salzberg, Wilmington, Del., assignor to E. I. du Pont de Nemours & Company, Wilmington, Del., a corporation of Delaware No Drawing. Application May 25, 1932
Serial No. 613,560

18 Claims. (Cl. 23—250)

This invention relates to a new process for purifying and stabilizing organo-inorganic esters and in one specific form it pertains to the purification and stabilization of organic silicon esters.

Inaba, Scientific Paper #278 of the Institute of Physical and Chemical Research of Tokyo, December 30, 1930, removes residual hydrogen chloride from ethyl silicate, prepared from silicon tetrachloride and ethanol, by treating first with sodium carbonate, and finally with silver oxide at 50–60° C. Japanese Patent 90,227 disclosed the method of removing hydrogen chloride from alkyl silicates by mixing the esters with a slight excess of the oxides of lead, mercury, or silver at 60° C., and decanting the liquid from the resultant metal chlorides.

One object of the invention pertains to a new process for stabilizing organo-inorganic esters. Another object relates to a new process for stabilizing organic silicon esters. A further object pertains to a process of stabilizing organo-inorganic esters prepared by reacting inorganic halides and organic hydroxy compounds, e. g., alcohols and phenols. A further object relates to the stabilization of organo-inorganic esters containing free acid as an impurity, by treatment with organic olefine oxides. A further object relates to the preparation of neutral organo-inorganic esters which are stable on storage.

These objects are accomplished by treating the organo-inorganic esters with an olefine oxide thereby removing or decreasing free or nascent acid, probably due to chemical combination of the olefine oxide with the said acid.

Referring particularly to organic esters of silicon, when organic silicates are prepared in the customary way from silicon tetrahalide, e. g., tetrachloride, and an alcohol or a phenol, and are distilled from the reaction mixture, they are not obtained free from hydrogen halide. Inaba (loc. cit.) has found that all of the hydrogen chloride is not removed from ethyl silicate prepared by interaction of silicon tetrachloride and ethyl alcohol, even after a repeated fractional distillation. By treatment of distilled ethyl silicate obtained according to the aforesaid method, with ethylene oxide, there can be obtained a product which is neutral to litmus.

The following examples, which are to be construed as illustrative only and not as limiting the scope of the invention, outline several preferred forms of the invention.

Example 1

Three hundred fourteen g. of distilled ethyl silicate containing approximately 1% of hydrogen chloride were treated with 10 cc. of ethylene oxide (sp. gr.=0.9) at 5° C. The mixture was then distilled immediately. The slight excess of ethylene oxide passed off as vapor, and the ethylene chlorhydrin formed in the reaction came over in the forerunnings. The ethyl silicate after this distillation was neutral to litmus and stable on long standing. An untreated sample decomposes on standing as evidenced by discoloration.

Example 2

In another experiment, absolute ethanol and silicon tetrachloride were reacted, and then heated to 90° C. for several hours to expel as much hydrogen chloride as possible. The crude mixture contained a little over 5% of hydrogen chloride by analysis. Four hundred forty-five g. of this crude product were treated (at room temperature) with 40 cc. of ethylene oxide. After one distillation, the ethyl silicate was neutral to litmus.

In the above examples ethylene oxide was added in liquid form to the contaminated ethyl silicate. The ethylene oxide may, however, be introduced as a gas, if desired, as by bubbling it through the liquid ester or through a solution of the solid ester. The gaseous ethylene oxide may be introduced until the solution reacts neutral to litmus.

The examples describe the reaction temperature in the neighborhood of room temperature or somewhat lower. It will be understood that any temperature above or below room temperature at which the reaction will occur may be used, provided the temperature is not above the boiling point of the ester undergoing treatment. Atmospheric pressure or pressures above or below atmospheric are suitable for the reaction.

The examples illustrated above are specific to the removal of hydrogen chloride from ethyl silicate for the purpose of stabilizing the ester. However, the process comprising the present invention is applicable to the treatment of any organic ester of inorganic acids prepared by the reaction of alcohols or phenols with the following inorganic halides: $SiHX_3$, $SOX_2$, $SO_2X_2$, $PX_3$, $PX_5$, $POX_3$, $SeOX_2$, $TeX_4$, $SnX_4$, $TiX_4$, $SbX_3$, $SbX_5$, $AsX_3$, $AsX_5$, $NOX$, $VOX_3$, $CrO_2X_2$, $MnO_3X$, wherein X represents a halogen. Each of these compounds are halides, either simple or compound, of non-halogen elements taken from groups 4 to 7 of the periodic table.

While ethylene oxide has been mentioned as a preferred treating agent, homologs and analogs of ethylene oxide may be used in lieu thereof, for example, propylene oxide, butylene oxide, butadiene dioxide, glycide alcohol and its ethers or esters, epichlorhydrin, and similar aliphatic olefine oxides. Aromatic compounds containing the linkage

e. g., styrene oxide, may also be used. It is only necessary for the purpose of the invention that the compound to be used as a stabilizing or treating agent have an olefine oxide structure, and that it react with hydrogen halide. When it is desired to obtain pure esters by distillation, the olefine oxide to be used should be chosen such that neither the oxide itself nor its reaction product with the hydrogen halide has a boiling point too close to that of the organo-inorganic esters to be treated in order to permit separation by fractional distillation. If pure esters are not desired, these other ingredients may be retained as inert diluents.

One advantage residing in the method of producing stable organo-inorganic esters described in the present invention, resides in the fact that there is no danger of hydrolyzing the esters due to the alkalinity of the reagent used. Another advantage is that in some cases the compound formed between the olefine oxide and the hydrogen halide need not be removed from the ester, but may be left in as an inert diluent. A still further advantage lies in the fact that according to the method of the present invention, less time is consumed than in other methods of stabilization known to the art.

The stable alkyl silicates prepared by this method are useful in the preparation of silicon ester paint media, stone preservatives, and for other uses to which alkyl silicates are adaptable. The other stable alkyl esters embraced within the scope of this invention may likewise be applied to the various arts with great advantage due to their increased stability and purity.

The term "olefine oxide" as used throughout the specification and claims is intended to include both aliphatic and aromatic oxides having an olefine oxide structure and which are capable of reacting with hydrogen halide. The term "alkyl" as used throughout the specification and claims is intended to include both aliphatic and aromatic radicals.

The above description and specific examples are to be taken as illustrative only and not as limiting the scope of the invention. Any modification or variation therefrom which conforms to the spirit of the invention is intended to be included within the scope of the claims.

I claim:

1. The process which comprises adding an olefine oxide to an alkyl ester containing free hydrogen halide and reacting the alkylene oxide with the hydrogen halide.

2. The process of claim 1 in which the olefine oxide is an aliphatic compound.

3. The process of claim 1 in which the olefine oxide is an aromatic compound.

4. The process of claim 1 in which the olefine oxide is a member of the group consisting of ethylene oxide, propylene oxide, butylene oxide, butadiene dioxide, glycide alcohol and its ethers and esters, epichlorhydrin, and styrene oxide.

5. The process of claim 1 in which the hydrogen halide is hydrogen chloride.

6. In the process of stabilizing organic esters of inorganic acids prepared by the reaction of inorganic halides with organic hydroxy compounds taken from the group consisting of alcohols and phenols, which esters contain free hydrogen halide, the step which comprises adding to said esters an olefine oxide, and reacting the olefine oxide with the free hydrogen halide.

7. The process of claim 6 in which the olefine oxide is an aliphatic compound.

8. The process of claim 6 in which the olefine oxide is an aromatic compound.

9. In the process of stabilizing organic esters of inorganic acids prepared by the reaction of an inorganic halide taken from the group consisting of : $SiHX_3$, $SOX_2$, $SO_2X_2$, $PX_3$, $PX_5$, $POX_3$, $SeOX_2$, $TeX_4$, $SnX_4$, $TiX_4$, $SbX_3$, $SbX_5$, $AsY_3$, $AsX_5$, $NOX$, $VOX_3$, $CrO_2X_2$, $MnO_3X$, wherein X represents a halogen atom, with an organic hydroxy compound taken from the group consisting of alcohols and phenols, said esters containing free hydrogen halide, the step which comprises adding to said esters an olefine oxide, and reacting the olefine oxide with the free hydrogen halide.

10. The process of claim 9 in which the olefine oxide is an aliphatic compound.

11. The process of claim 9 in which the olefine oxide is an aromatic compound.

12. The process of stabilizing organic silicates containing free hydrogen halide, the step which comprises adding to said esters an olefine oxide, and reacting said olefine oxide with the free hydrogen halide.

13. The process of claim 12 in which the olefine oxide is an aliphatic compound.

14. The process of claim 12 in which the olefine oxide is an aromatic compound.

15. In the process of stabilizing an aliphatic alkyl silicate containing free hydrogen halide, the step which comprises adding to said silicate ethylent oxide, and reacting said ethylene oxide with the free hydrogen halide.

16. In the process of stabilizing ethyl silicate containing free hydrogen chloride, the step which comprises adding to the said silicate ethylene oxide, and reacting the ethylene oxide with the free hydrogen chloride.

17. The process which comprises adding ethylene oxide to ethyl silicate containing hydrogen chloride, and reacting the ethylene oxide and the hydrogen chloride.

18. The process which comprises adding ethylene oxide to ethyl silicate containing hydrogen chloride, reacting the ethylene oxide and the hydrogen chloride, then distilling the reaction mixture to remove the unreacted ethylene oxide and the product resulting from the reaction between ethylene oxide and hydrogen chloride.

PAUL L. SALZBERG.